UNITED STATES PATENT OFFICE.

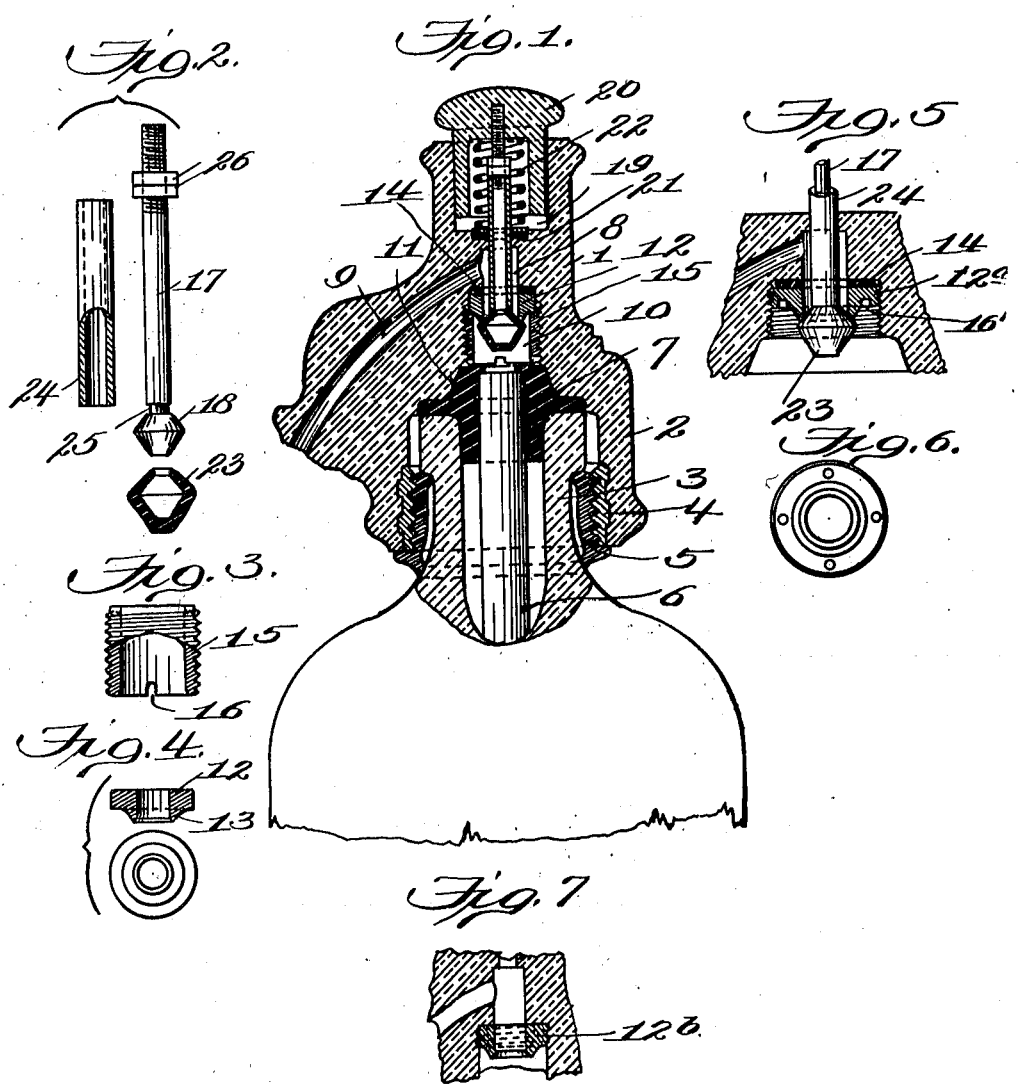

CHARLES DE LUKACSEVICS, OF WEST NUTLEY, NEW JERSEY.

SIPHON-HEAD.

1,040,226.  Specification of Letters Patent.  Patented Oct. 1, 1912.

Application filed September 12, 1911, Serial No. 648,882. Renewed August 21, 1912. Serial No. 716,316.

*To all whom it may concern:*

Be it known that I, CHARLES DE LUKACSEVICS, a citizen of the United States, residing at West Nutley, in the county of Essex and State of New Jersey, have invented new and useful Improvements in Siphon-Heads, of which the following is a specification.

This invention relates to improvements in siphon heads and it deals more particularly with the valve construction, having in view an efficient sealing relation between the valve seat and the valve, and a valve organization of strong and sanitary nature.

An embodiment of the invention is illustrated in the accompanying drawing, wherein:—

Figure 1 is a vertical sectional view of a siphon head in which the present improvements are carried out; Fig. 2 is a view showing in separate relation the details of the valve construction; Fig. 3 is a view showing a retaining collar for the valve seat; Fig. 4 is a view showing the valve seat in plan and sectional detail; Fig. 5 is a detail sectional view showing a modification of the valve seat construction; Fig. 6 is a plan view of the same; and Fig. 7 is a detail sectional view showing a further modification of the valve seat construction.

Similar characters of reference designate corresponding parts throughout the several views.

The improvements are illustrated in connection with a porcelain head, designated generally as 1, and having its lower end in the form of an enlarged socket 2 which fits over the bottle neck 3 and is held in position by suitable means, such, for example, as the coöperating securing rings 4 and 5 associated with the socket and with the neck respectively. The siphon tube is shown at 6 and is held in position by suitable means, such, for example, as the gasket 7 which is fitted between the neck 3 and the socket 2. In this connection, it may be noted that the rings 4 and 5 and the gasket 7 do not form the subject of the present invention, but are claimed in my copending application, Serial No. 615,703.

The head 1 is provided with an axial duct 8 and with a curved liquid discharge duct 9, extending at an angle from the duct 8. Below the duct 8 said head is provided with an axially disposed valve chamber 10 which extends from the coniform opening 11 in which the upper boss of the gasket 7 fits.

At the upper end of the valve chamber 10 there is arranged an annular valve seat 12, having on its under face a relatively sharp valve engaging rib or projection 13. In the embodiment shown in Fig. 1, an elastic sealing gasket 14 is interposed between the valve seat 12 and the upper face of the chamber 10, and said valve is held firmly against the gasket 14 so as to more or less compress the latter, by means of a ring or collar 15 which is threaded into the valve chamber and has in its lower edge oppositely disposed recesses 16 to enable the use of a spanner for turning the ring or collar 15. Or, if desired, the ring or collar 15 may be omitted and the valve seat, as at 12$^a$, directly threaded into the chamber 10, as shown in Fig. 5, in which case the valve seat has in its underface recesses 16' for the same purpose as the recesses 16. In Fig. 7 a further modification of the valve seat construction is shown, in which the chamber 10 has its upper portion formed with rough threads or corrugations, and the valve seat, as at 12$^b$, composed of hard rubber or an equivalent non-corrosive and non-porous substance, is molded directly in the upper portion of the valve chamber and thereafter is machined.

The valve construction includes a metal stem 17 which carries at its lower end a head 18, the latter being preferably of double coniform construction and working in the chamber 10. The stem 17 passes through the duct 8 and through an axial recess 19 in the upper portion of the head 1, and the upper end of said stem is threaded into an operating knob 20. The web or flange which intervenes between the duct 8 and the recess 19 is provided with a packing gasket 21 to prevent leakage of the gas, and serves as a seat for an expansive coil spring 22 which surrounds the stem and is disposed in a recess in the under face of the knob 20.

The valve proper includes the head 18 above referred to, and a rubber envelop 23 which is stretched over said head and which is engaged by the rib or projection 13 previously referred to. A hard rubber sleeve 24 surrounds the stem 17 throughout the greater portion of the length of the latter, and serves the dual purpose of rendering the valve construction sanitary and of securing the envelop 23 in position. The stem 17 is formed adjacent the head 18 with an annular groove 25, and the upper end portion of the envelop 23 is held or clenched into this groove by the sleeve 24, the lower end of said sleeve being pressed against the envelop adjacent the groove. This action of the sleeve 24 is positively provided for by nuts 26 which are arranged on the threaded portion of the stem 17 in such a position as to hold the sleeve against the envelop in the manner explained.

It will be apparent from the foregoing description that the valve seat construction described is of great advantage in that it provides for the use of a valve seat of material different from the head and which at the same time will be non-corrosive and non-porous, and it also provides for a gas-tight assemblage of the seat. The valve construction is of advantage in that it provides for a valve head which has an elastic engaging surface and thereby may have a gas-tight fit against the seat, and it also provides for a stem of metal and hence not liable to breakage, yet having a rubber facing which renders the construction sanitary and serves as a means for securing the envelop which is fitted upon the valve head.

Having fully described my invention, I claim:—

1. In a siphon head, a valve construction including a valve stem having an enlarged valve head at one end thereof, a rubber envelop fitted over the head, and a sleeve surrounding the stem and engaging the envelop with clamping pressure, thereby serving to fix the envelop in position.

2. In a siphon head, a valve construction including a metal valve stem having an enlarged valve head at one end thereof, a rubber envelop fitted over the head, and a hard rubber sleeve surrounding the stem and engaging the envelop with clamping pressure, thereby serving to fix the envelop in position.

3. In a siphon head, a valve construction including a valve stem having an enlarged valve head at one end thereof, a rubber envelop fitted over the head, a sleeve surrounding the stem and engaging the envelop with clamping pressure, thereby serving to fix the envelop in position, and a nut threaded upon the stem and engaging that end of the sleeve which is distant from the valve head.

4. In a siphon head, a valve construction including a valve stem having an enlarged valve head at one end thereof and having a groove adjacent the valve head, a rubber envelop fitted over the head, a sleeve surrounding the stem and serving to press the edge portion of the envelop into the groove, and a nut threaded upon the stem and engaging that end of the sleeve which is distant from the valve head.

In testimony whereof I have hereunto set my hand in presence of two subscribing witnesses.

CHARLES DE LUKACSEVICS.

Witnesses:
JAMES S. CONOVER,
A. L. HUNTLEY.